United States Patent
El-Toufaili et al.

(10) Patent No.: US 11,725,102 B2
(45) Date of Patent: Aug. 15, 2023

(54) METHOD OF PROVIDING HOMOGENEOUS AQUEOUS POLYACRYLAMIDE CONCENTRATES AND USE THEREOF

(71) Applicant: BASF SE, Ludwigshafen am Rhein (DE)

(72) Inventors: Faissal-Ali El-Toufaili, Ludwigshafen am Rhein (DE); Dennis Loesch, Ludwigshafen am Rhein (DE); Anna-Corina Schmidt, Trostberg (DE); Tobias Joachim Zimmermann, Ludwigshafen am Rhein (DE); Markus Ostermayr, Ludwigshafen am Rhein (DE); Jack F. Tinsley, Houston, TX (US); Brent Busby, Houston, TX (US); Daniel Barrera-Medrano, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 17/286,477

(22) PCT Filed: Oct. 17, 2019

(86) PCT No.: PCT/EP2019/078213
§ 371 (c)(1),
(2) Date: Apr. 18, 2021

(87) PCT Pub. No.: WO2020/079149
PCT Pub. Date: Apr. 23, 2020

(65) Prior Publication Data
US 2021/0347977 A1    Nov. 11, 2021

(30) Foreign Application Priority Data

Oct. 18, 2018 (EP) .................................... 18201107
Apr. 12, 2019 (EP) .................................... 19168880

(51) Int. Cl.
C09K 8/588 (2006.01)
C08L 33/26 (2006.01)
E21B 43/16 (2006.01)

(52) U.S. Cl.
CPC .............. C08L 33/26 (2013.01); C09K 8/588 (2013.01); E21B 43/162 (2013.01)

(58) Field of Classification Search
CPC ..... C08L 33/26; C09K 8/588; C09K 2208/28; C09K 8/68; C09K 8/88; E21B 43/162; E21B 43/16; C08J 2333/26; C08J 3/22; B01F 21/00
See application file for complete search history.

(56) References Cited

U.S. PATENT DOCUMENTS

| | | | | |
|---|---|---|---|---|
| 3,254,719 A * | 6/1966 | Root | ..................... | C09K 8/62 |
| | | | | 507/225 |
| 4,525,515 A | 6/1985 | Peignier et al. | | |
| 8,360,152 B2 | 1/2013 | Defosse et al. | | |
| 8,851,179 B2 | 10/2014 | Defosse et al. | | |
| 2002/0095965 A1* | 7/2002 | Arnold | ................. | B02C 19/005 |
| | | | | 71/64.08 |
| 2012/0273206 A1 | 11/2012 | Zamora et al. | | |
| 2013/0292122 A1* | 11/2013 | Nichols | ................. | E21B 21/062 |
| | | | | 166/308.1 |
| 2014/0364346 A1 | 12/2014 | Weinstein et al. | | |
| 2015/0240148 A1 | 8/2015 | Luharuka et al. | | |
| 2017/0037696 A1 | 2/2017 | Lopez et al. | | |
| 2017/0320660 A1* | 11/2017 | Sanders | ............... | B65G 65/425 |
| 2019/0316032 A1* | 10/2019 | Byrd | ....................... | C09K 8/68 |

FOREIGN PATENT DOCUMENTS

| | | | |
|---|---|---|---|
| CA | 2592717 A1 | 12/2008 | |
| WO | 2006/034853 A1 | 4/2006 | |
| WO | 2008/071808 A1 | 6/2008 | |
| WO | 2008/081048 A2 | 7/2008 | |
| WO | 2008/107492 A1 | 9/2008 | |
| WO | 2009/010932 A2 | 1/2009 | |
| WO | WO-2009010932 A2 * | 1/2009 | ............. B01F 15/06 |
| WO | 2010/020698 A2 | 2/2010 | |
| WO | 2010/133527 A2 | 11/2010 | |
| WO | 2012/069478 A1 | 5/2012 | |
| WO | 2015/024865 A1 | 2/2015 | |
| WO | 2015/086468 A1 | 6/2015 | |
| WO | 2015/158517 A1 | 10/2015 | |

OTHER PUBLICATIONS

European Search Report for EP Patent Application No. 18201107.2, dated Mar. 19, 2019, 3 pages.
International Search Report and Written Opinion received for PCT Patent Application No. PCT/EP2019/078213, dated Nov. 15, 2019, 10 pages.

* cited by examiner

*Primary Examiner* — Kumar R Bhushan
(74) *Attorney, Agent, or Firm* — Faegre Drinker Biddle & Reath LLP (57) ABSTRACT

Process of providing polyacrylamides to a site-of-use comprising at least the steps of mixing a polyacrylamide powder at a manufacturing site with an aqueous liquid, thereby obtaining a homogeneous aqueous polyacrylamide concentrate, transporting said concentrate in a transport unit from the manufacturing site to the site-of-use, and removing the homogeneous aqueous concentrate from the transport unit at the site-of-use. Process of treating subterranean, oil and/or gas bearing formations by injecting an aqueous treatment fluid into at least one wellbore, wherein the aqueous treatment fluid is manufactured by mixing at least an aqueous base fluid with said homogeneous aqueous polyacrylamide concentrate at the site-of-use.

13 Claims, 2 Drawing Sheets

Figure 1: Geometry of beater

Figure 2: Comparison chart of % Friction Reduction vs. Time.

METHOD OF PROVIDING HOMOGENEOUS AQUEOUS POLYACRYLAMIDE CONCENTRATES AND USE THEREOF

CROSS-REFERENCE TO RELATED APPLICATIONS

This application is a national stage application (under 35 U.S.C. § 371) of PCT/EP2019/078213, filed Oct. 17, 2019, which claims benefit of European Application Nos. 18201107.2, filed Oct. 18, 2018, and 19168880.3, filed Apr. 12, 2019, all of which are incorporated herein by reference in their entirety.

The invention relates to a process of providing polyacrylamides to a site-of-use comprising at least the steps of mixing a polyacrylamide powder at a manufacturing site with an aqueous liquid, thereby obtaining a homogeneous aqueous polyacrylamide concentrate, transporting said concentrate in a transport unit from the manufacturing site to the site-of-use, and removing the homogeneous aqueous polyacrylamide concentrate from the transport unit at the site-of-use. The invention furthermore relates to a process of treating subterranean, oil and/or gas bearing formations by injecting an aqueous treatment fluid into at least one wellbore, wherein the aqueous treatment fluid is manufactured by mixing at least an aqueous base fluid with said homogeneous aqueous polyacrylamide concentrate at the site-of-use.

Water-soluble, high molecular weight homo- and copolymers of acrylamide may be used for various applications such as mining and oilfield applications, water treatment, sewage treatment, papermaking, and agriculture. Examples of oilfield applications include their use as thickener in aqueous injection fluids for enhanced oil recovery, as rheology modifier for aqueous drilling fluids, or as friction reducer in aqueous fracturing fluids.

Polyacrylamides are commercially available basically as powders or inverse emulsions, however, they are usually used as dilute aqueous solutions. Consequently, both polyacrylamide powders and inverse emulsions need to be dissolved in aqueous fluids before use.

Dissolving high molecular weight polymers in aqueous fluids is time consuming and it is difficult to do so without degrading the polymers and/or without forming lumps. Suitable equipment for dissolving large amounts of polyacrylamide powders is therefore necessary on-site.

WO 2008/107492 A1 discloses a device for dispersing water-soluble polymers, such as polyacrylamides having a standard grain size from 0.15 mm to 1 mm comprising a wetting cone in which the polymer is metered, said cone being connected with a primary water inlet circuit and a chamber for grinding and draining the dispersed polymer comprising a rotor equipped with knives, a fixed stator consisting of blades and on the periphery of the chamber a secondary water circuit for spraying pressurized water on the blades of the stator, thereby releasing the ground and swollen polymer on the surface of the blades. The dispersed polymer released has a concentration of between 0.3% to 3% by wt., preferably 1% to 2.5% by wt.

WO 2008/081048 A2 discloses an installation for dissolving water-soluble polymers, in particular polyacrylamides in aqueous fluids for use in enhanced oil recovery comprising the same kind of grinding device as described above. The installation furthermore comprises a pump. By means of said pump, the polymer suspension is injected into the pipeline conveying the injection water to the oil well. The polymer suspension finally dissolves in the injection water in course of passing through said pipeline and through the well. The concentration of the polymer in the polymer suspension is from 0.5% to 3% by wt.

WO 2008/071808 A1 discloses an installation for dissolving water-soluble polymers, in particular polyacrylamides in aqueous fluids for use for enhanced oil recovery comprising the same kind of grinding device but the installation additionally comprises dissolution tanks in which the polymer dispersion dissolves before the solution is used for enhanced oil recovery. The concentration of the polymer dispersion is from 0.3 to 3% by wt., preferably from 1 to 2.5% by wt. and the concentration of the final solution to be used is the same. Once dissolved, by means of a pump, the polymer solution is injected into the pipeline conveying the injection water to the oil well.

WO 2010/020698 A2 discloses a transportable installation for quick dispersion of polyacrylamide powder for fracturing operations where the polyacrylamide serves as friction reducer. The installation is compact and may be transported on the platform of a truck. The installation comprises a grinding device as already described above (called polymer slicing unit), a polymer storage area, a polymer dosing system, a tank for storage and degassing the polymer and a pump for dosing the solution into the fracturing system. The final concentration of the dispersed polymer is at least 1% by wt.

US 2013/0292122 A1 discloses a transportable installation for dissolving polyacrylamide powders to be used for fracturing operations on oil and gas fields, comprising a grinding device as described above comprising additionally a silo for storing polymer in powder form and pneumatic means for supplying the silo with powder polymer, at least two tanks for hydrating and dissolving the dispersed polymer origination from the grinding device, and at least two volumetric pumps enabling injection and metering of the polymer solution in a mixer used for supplying high-pressure fracturing pumps. The polymer concentration preferably is 2% by wt. It may be increased to 3% by wt. while keeping the viscosity below 10,000 mPas enabling easy pumping.

It is known in the art to enhance the productivity of such oil and/or gas wells by hydraulic fracturing. In course of hydraulic fracturing, an aqueous fracturing fluid is injected into the well at a pressure sufficient to penetrate into the subterranean formation and to generate new fractures or fissures in the subterranean formation and/or to extend existing fractures of fissures thereby enhancing its permeability. In order to hold the fractures open also after removal of the pressure, the fracturing fluid usually comprises so-called proppants. Proppants are small hard particles, such as for example, naturally-occurring sand grains.

Because the density of proppants, such as sand particles usually is significantly higher than that of aqueous fluids, the suspension of the proppants in the fluid and the transport by the fluid requires particular attention. It is necessary to avoid that proppant settle in course of transport, for example in the wellbore or in pipe which transport the fracturing fluid.

Basically, two different techniques are known in the art for avoiding such settlement of proppants, namely either increasing the viscosity of the fluid using a suitable viscosifier or flowing the fluid at very high speed. The latter method, also known as slickwater fracturing, is often preferred, but the high speeds employed create turbulent flow with excessive pumping pressure. Necessary pressures often are too high for the field equipment and the net effect is that the required flow rate is not achieved. To avoid this problem, it is known in the art to employ friction reducers that dampen the turbulent eddies, creating pressure drops approaching those of laminar flow. Examples of suitable friction reducers in particular include high molecular weight polyacrylamides.

US 2017/0037696 A1 discloses a method of preparing a fracturing slurry comprising preparing a concentrated gel from polymer and water and diluting the concentrated gel with additional water to form a fracturing carrier fluid upon allowing the concentrated gel sufficient residence time to at least partially hydrate, preparing a fracturing slurry comprising the fracturing carrier fluid and pumping the fracturing fluid downhole. Examples of polymers comprise guar, guar derivatives, cellulosic derivatives or polyacrylamides. The polymer concentration of the gel may be up to 1.44% by weight and the downhole polymer concentration may be from 0.06% b weight to 0.48% by weight.

U.S. Pat. Nos. 8,851,179 B2 and 8,360,152 B2 each disclose a process of preparing friction reduced hydraulic fracturing fluid at a central location comprising preparing a mixture of polymer and water at a central location in a high-shear environment to create a friction-reduced hydraulic fracturing fluid, pumping the friction-reduced hydraulic fracturing fluid through a series of pumps and pipelines to the well site and injecting the hydraulic fracturing fluid into an oil or gas well at a pressure sufficient to cause fracturing of the formation.

US 2014/0364346 A1 discloses a viscos fluid dilution system. A solid polymer is mixed with water in a mixer and the mixture transferred to a hydration tank to achieve a viscos fluid. The concentration of the fluid may be—for example—0.48% by weight. The viscos fluid is diluted in a second step with additional water. The concentration of the diluted fluid may be—for example—0.24% by wt. The diluted fluid may be mixed thereafter with a proppant and used for fracturing.

US 2015/0240148 A1 discloses a method comprising mixing a substantially continuous stream of hydratable material with a substantially continuous stream of aqueous fluid with a mixer to form a gel having a first concentration, combining a substantially continuous stream of a gel having a first concentration with an aqueous fluid to form a substantially continuous stream of a gel having a second concentration, wherein the second concentration is substantially lower than the first concentration and utilizing the gel having a second concentration.

CA 2 592 717 A1 discloses a method of distributing polymer to one or more injection well sites comprising providing a polymer mother solution, pumping the polymer mother solution through a pipeline or network of pipes from a first location to one or more remote locations comprising at least one injection pod or wellsite, mixing the polymer mother solution with water and optionally one or more additional components to form a daughter solution and injecting the daughter solution into a well. The document also discloses a suitable polymer transport and distribution system for carrying out the method. The polymer mother solution may comprise 0.5% to 1.5% by weight of polymers and typical polymer concentrations in the polymer daughter solution are from 0.1% to 0.15% by weight.

Furthermore, inhomogeneous concentrates of polyacrylamides and their use are known in the art.

U.S. Pat. No. 4,525,515 relates to storage-stable, pumpable, concentrated suspensions of water-soluble polymers, such as for example polyacrylamides or polyacrylamide copolymers, comprising a particulate, water-soluble polymer, one surfactant having an HLB≤10, and water, wherein the amount of water is less than 30% by weight and the ratio polymer/surfactant is 20-90/80-10.

US 2002/0095965 A1 discloses a stable emulsion of water-soluble polyacrylamide particles in an aqueous medium. The emulsions are made by providing a saturated solution of an ammoniated salt, such as for example ammonium sulfate of ammonium nitrate, and dispersing polyacrylamide particles therein. The concentration is at least 2.5% polyacrylamide by weight.

WO 2009/010932 A1 discloses a method of preparing a hydratable polymer concentrate by mixing a water-soluble polymer, a partitioning agent (for example polyethylene oxide) and water thereby obtaining a water-in-water emulsion. The partitioning agent severely limits the solubility of the water-soluble polymer, so that an emulsion and not a solution is obtained. The dispersed phase may be a liquid droplet of polymer solution, or a paste-like or water-wet polymer globule containing solid polymer particles.

Fracturing a subterranean formation typically does not require long term injection of aqueous fluids into the formation. In a typical "frac job" pumping for each discrete stage may last a few hours. In between stages, pumping is stopped to prepare for the next stage. Several stages are completed for an entire well, so the process is completed in a matter of days or weeks. For that reason, usually the equipment necessary for fracturing is transportable, for example mounted on trucks, on trailers or in containers and transported to the oil and/or gas well with a need of a fracturing treatment. After carrying out the "frac job", the equipment is transported to another oil and/or gas well with a need of a fracturing treatment. The transportable installations for dissolving polyacrylamide powders as discussed above have been designed for that purpose.

Typically, the number of oil wells on an oil field is large. Even if one fracturing job has been finished, there may by a need of fracturing oil wells on the same oilfield, i.e. not too far apart from the last fracturing job.

The present application relates to a new method of providing polyacrylamides for oilfield applications, in particular for use as frictions reducers for hydraulic fracturing. The polyacrylamides are provided to the site-of-use as aqueous polyacrylamide concentrates, available by dissolution of polyacrylamide powders.

Accordingly, the present invention relates to a process of providing polyacrylamides comprising at least the following steps

[1] Mixing a polyacrylamide powder at a location A with an aqueous liquid by means of a mixing unit, thereby obtaining a homogeneous aqueous polyacrylamide concentrate having a concentration from 1% to 14.9% by weight of polyacrylamides, relating to the total of all components of the homogeneous aqueous polyacrylamide concentrate,

[2] Transporting said homogeneous aqueous concentrate in a transport unit having a volume from 1 $m^3$ to 40 $m^3$ by transport means selected from the group of trucks, railcars or ships from the location B to a different location B,

[3] removing the homogeneous aqueous concentrate from the transport unit at location B.

Preferably, the homogeneous aqueous polyacrylamide concentrate has a concentration from 3.1% to 14.9% by weight of polyacrylamides, relating to the total of all components of the aqueous polyacrylamide concentrate.

List of figures:

| FIG. 1 | Geometry of beater used for mixing |
|---|---|
| FIG. 2 | Results of Friction Loop experiments |

With regard to the invention, the following should be stated specifically:

In the process according to the present invention, polyacrylamides are provided to a site-of-use as homogeneous aqueous polyacrylamide concentrates, having a concentration of 1 to 14.9% by weight, preferably from 3.1 to 14.9% by weight of polyacrylamides, wherein the concentration relates to the total of all components of the aqueous polyacrylamide concentrate.

Said homogeneous aqueous polyacrylamide concentrates are manufactured by mixing a polyacrylamide powder at a manufacturing-site (Location A) apart from the site-of-use (Location B) with an aqueous liquid by means of a mixing unit, transporting said aqueous polyacrylamide concentrates in a suitable transport unit from the manufacturing site of a site-of-use removing the concentrate from the transport unit at the site-of-use.

Polyacrylamides

The aqueous polyacrylamide concentrates according to the present invention comprise at least one polyacrylamide.

The term "polyacrylamides" as used herein means water-soluble homopolymers of acrylamide, or water-soluble copolymers comprising at least 10 mole %, preferably at least 20 mole %, and more preferably at least 30 mole % of acrylamide and at least one additional water-soluble, monoethylenically unsaturated monomer different from acrylamide, wherein the amounts relate to the total amount of all monomers in the polymer. Copolymers are preferred.

The term "water-soluble monomers" in the context of this invention means that the monomers are to be soluble in the aqueous monomer solution to be used for polymerization in the desired use concentration. It is thus not absolutely necessary that the monomers to be used are miscible with water without any gap; instead, it is sufficient if they meet the minimum requirement mentioned. It is to be noted that the presence of acrylamide in the monomer solution might enhance the solubility of other monomers as compared to water only. In general, the solubility of the water-soluble monomers in water at room temperature should be at least 50 g/l, preferably at least 100 g/l.

Basically, the kind and amount of water-soluble, monoethylenically unsaturated comonomers to be used besides acrylamide is not limited and depends on the desired properties of the polyacrylamide friction reducer to be used within the contact of the present invention.

Neutral Comonomers

In one embodiment of the invention, comonomers may be selected from uncharged water-soluble, monoethylenically unsaturated monomers. Examples comprise methacrylamide, N-methyl(meth)acrylamide, N,N'-dimethyl(meth)acrylamide, N-methylol(meth)acrylamide or N-vinylpyrrolidone. Further examples have been mentioned in WO 2015/158517 A1 page 7, lines 9 to 14.

Anionic Comonomers

In a further embodiment of the invention, comonomers may be selected from water-soluble, monoethylenically unsaturated monomers comprising at least one acidic group, or salts thereof. The acidic groups are preferably selected from the group of —COOH, —SO$_3$H and —PO$_3$H$_2$ or salts thereof. Preference is given to monomers comprising COOH groups and/or —SO$_3$H groups or salts thereof. Suitable counterions include especially earth alkali metal ions such as Ca$^{2+}$, alkali metal ions such as Li$^+$, Na$^+$ or K$^+$, and also ammonium ions such as NH$_4^+$ or ammonium ions having organic radicals. Examples of ammonium ions having organic radicals include [NH(CH$_3$)$_3$]$^+$, [NH$_2$(CH$_3$)$_2$]$^+$, [NH$_3$(CH$_3$)]$^+$, [NH(C$_2$H$_5$)$_3$]$^+$, [NH$_2$(C$_2$H$_5$)$_2$]$^+$, [NH$_3$(C$_2$H$_5$)]$^+$, [NH$_3$(CH$_2$CH$_2$OH)]$^+$, [H$_3$N—CH$_2$CH$_2$—NH$_3$]$^{2+}$ or [H(H$_3$C)$_2$N—CH$_2$CH$_2$CH$_2$NH$_3$]$^{2+}$.

Examples of monomers comprising —COOH groups include acrylic acid, methacrylic acid, crotonic acid, itaconic acid, maleic acid or fumaric acid or salts thereof. Preference is given to acrylic acid or salts thereof.

Examples of monomers comprising —SO$_3$H groups or salts thereof include vinylsulfonic acid, allylsulfonic acid, 2-acrylamido-2-methylpropanesulfonic acid (ATBS), 2-methacrylamido-2-methylpropanesulfonic acid, 2-acrylamidobutanesulfonic acid, 3-acrylamido-3-methylbutanesulfonic acid or 2-acrylamido-2,4,4-trimethylpentanesulfonic acid. Preference is given to 2-acrylamido-2-methylpropanesulfonic acid (ATBS) or salts thereof.

Examples of monomers comprising —PO$_3$H$_2$ groups or salts thereof include vinylphosphonic acid, allylphosphonic acid, N-(meth)acrylamidoalkylphosphonic acids or (meth)acryloyloxyalkylphosphonic acids, preferably vinylphosphonic acid.

Preferred monomers comprising acidic groups comprise acrylic acid and/or ATBS or salts thereof.

Cationic Comonomers

In a further embodiment of the invention, comonomers may be selected from water-soluble, monoethylenically unsaturated monomers comprising cationic groups. Suitable cationic monomers include especially monomers having ammonium groups, especially ammonium derivatives of N-(ω-aminoalkyl)(meth)acrylamides or ω-aminoalkyl (meth)acrylates such as 2-trimethylammonioethyl acrylate chloride H$_2$C=CH—CO—CH$_2$CH$_2$N$^+$CH$_3$)$_3$Cl$^-$ (DMA3Q). Further examples have been mentioned in WO 2015/158517 A1 page 8, lines 15 to 37. Preference is given to DMA3Q.

Associative Comonomers

In a further embodiment of the invention, comonomers may be selected from associative monomers.

Associative monomers impart hydrophobically associating properties to polyacrylamides. Associative monomers to be used in the context of this invention are water-soluble, monoethylenically unsaturated monomers having at least one hydrophilic group and at least one, preferably terminal, hydrophobic group. Examples of associative monomers have been described for example in WO 2010/133527, WO 2012/069478, WO 2015/086468 or WO 2015/158517.

"Hydrophobically associating copolymers" are understood by a person skilled in the art to mean water-soluble copolymers which, as well as hydrophilic units (in a sufficient amount to assure water solubility), have hydrophobic groups in lateral or terminal positions. In aqueous solution, the hydrophobic groups can associate with one another. Because of this associative interaction, there is an increase in the viscosity of the aqueous polymer solution compared to a polymer of the same kind that merely does not have any associative groups.

Examples of suitable associative monomers comprise monomers having the general formula H$_2$C=C(R$^1$)—R$^2$—R$^3$ (I) wherein R$^1$ is H or methyl, R$^2$ is a linking hydrophilic group and R$^3$ is a terminal hydrophobic group. Further examples comprise having the general formula H$_2$C=C (R$^1$)—R$^2$—R$^3$R$^4$ (II) wherein R$^1$, R$^2$ and R$^3$ are each as defined above, and R$^4$ is a hydrophilic group.

The linking hydrophilic $R^2$ group may be a group comprising ethylene oxide units, for example a group comprising 5 to 80 ethylene oxide units, which is joined to the $H_2C=C(R^1)$— group in a suitable manner, for example by means of a single bond or of a suitable linking group. In another embodiment, the hydrophilic linking group $R^2$ may be a group comprising quaternary ammonium groups.

In one embodiment, the associative monomers are monomers of the general formula $H_2C=C(R^1)$—O—$(CH_2CH_2O)_k$—$R^{3a}$ (III) or $H_2C=C(R^5)$—(C=O)—O—$(CH_2CH_2O)_k$—$R^{3a}$ (IV), wherein $R^1$ has the meaning defined above and k is a number from 10 to 80, for example, 20 to 40. $R^{3a}$ is an aliphatic and/or aromatic, straight-chain or branched hydrocarbyl radical having 8 to 40 carbon atoms, preferably 12 to 32 carbon atoms. Examples of such groups include n-octyl, n-decyl, n-dodecyl, n-tetradecyl, n-hexadecyl or n-octadecyl groups. In a further embodiment, the groups are aromatic groups, especially substituted phenyl radicals, especially distyrylphenyl groups and/or tristyrylphenyl groups.

In another embodiment, the associative monomers are monomers of the general formula $H_2C=C(R^1)$—O—$(CH_2)_n$—O—$(CH_2CH_2O)_x$—$(CH_2$—$CH(R^5)O)_y$—$(CH_2CH_2O)_zH$ (V), wherein $R^1$ is defined as above and the $R^5$ radicals are each independently selected from hydrocarbyl radicals comprising at least 2 carbon atoms, preferably from ethyl or propyl groups. In formula (V) n is a natural number from 2 to 6, for example 4, x is a number from 10 to 50, preferably from 12 to 40, and for example, from 20 to 30 and y is a number from 5 to 30, preferably 8 to 25. In formula (V), z is a number from 0 to 5, for example 1 to 4, i.e. the terminal block of ethylene oxide units is thus merely optionally present. In an embodiment of the invention, it is possible to use at least two monomers (V), wherein the $R^1$ and $R^6$ radicals and indices n, x and y are each the same, but in one of the monomers z=0 while z>0 in the other, preferably 1 to 4.

In another embodiment, the associative monomers are cationic monomers. Examples of cationic associative monomers have been disclosed in WO 2015/158517 A1, page 11, line 20 to page 12, lines 14 to 42. In one embodiment, the cationic monomers having the general formula $H_2C=C(R^1)$—C(=O)O—$(CH_2)_k$—$N^+(CH_3)(CH_3)(R^6)X^-$ (VI) or $H_2C=C(R^1)$—C(=O)N($R^1$)—$(CH_2)_k$—$N^+(CH_3)(CH_3)(R^6)X^-$ (VII) may be used, wherein $R^1$ has the meaning as defined above, k is 2 or 3, $R^6$ is a hydrocarbyl group, preferably an aliphatic hydrocarbyl group, having 8 to 18 carbon atoms, and $X^-$ is a negatively charged counterion, preferably $Cl^-$ and/or $Br^-$.

Further Comonomers

Besides water-soluble monoethylenically unsaturated monomers, also water-soluble, ethylenically unsaturated monomers having more than one ethylenic group may be used. Monomers of this kind can be used in special cases in order to achieve easy crosslinking of the acrylamide polymers. The amount thereof should generally not exceed 2 mole %, preferably 1 mole % and especially 0.5 mole %, based on the sum total of all the monomers. More preferably, the monomers to be used in the present invention are only monoethylenically unsaturated monomers.

In another embodiment of the invention, ethylenically unsaturated monomers comprising stabilizing groups, such as the monomers disclosed in WO 2015/024865 A1 may be used, for example the (meth)acrylic acid ester of 1,2,2,6,6-pentamethyl-4-piperidinol.

Composition of the Polyacrylamides

The specific composition of the polyacrylamides to be used in the process of slickwater fracturing according to the present invention may be selected by the skilled artisan according to his/her needs. The following compositions preferred:

Preferred polyacrylamides comprise, besides at least 10 mole % of acrylamide, at least one comonomer, preferably at least one comonomer selected from the group anionic comonomers, cationic comonomers or associative comonomers as described above. In one embodiment, such preferred polyacrylamides comprise at least one comonomer selected from the group of acrylic acid or salts thereof, ATBS or salts thereof, associative monomers, in particular those of formula (V) or DMA3Q, more preferably at least one comonomer selected from acrylic acid or salts thereof, ATBS or salts thereof, associative monomers, in particular those of formula (V).

In one embodiment, the polyacrylamides comprise 20 mole % to 95 mole % of acrylamide and 5 mole % to 80 mole % of acrylic acid and/or salts thereof, wherein the amounts of the monomers relate to the total of all monomers in the polymer.

In one embodiment, the polyacrylamides comprise 70 mole % to 95 mole % of acrylamide and 5 mole % to 30 mole % of acrylic acid and/or salts thereof.

In one embodiment, the polyacrylamides comprise 40 mole % to 90 mole % of acrylamide, 5 mole % to 30 mole % of acrylic acid and/or salts thereof, and 5 mole % to 30 mole % of ATBS and/or salts thereof.

In one embodiment, the polyacrylamides comprise 69 mole % to 94.995 mole % of acrylamide, 0.005 mole % to 1 mole % of at least one associative monomer of the general formula (V) mentioned above, including the preferred embodiments, and 5 mole % to 30 mole % of acrylic acid or salts thereof.

In one embodiment, the polyacrylamides comprise 70 mole % to 99 mole % of acrylamide and 1 mole % to 30 mole % of a cationic comonomer, preferably DMA3Q.

In one embodiment, the polyacrylamides comprise 69 mole % to 99.995 mole % of acrylamide, 0.005 mole % to 1 mole % of at least one associative monomer, and 0 mole % to 30 mole % of an anionic monomer, for example ATBS or a cationic monomer, for example DMA3Q. Preferably, the associative monomer(s) have the general formula (V) including the preferred embodiments mentioned above.

In all embodiments mentioned above, the amount of the monomers relates to the total of all monomers in the polyacrylamide. Further water-soluble, monoethylenically unsaturated monomers may be present besides those specifically mentioned, however, the embodiments each include also one embodiment in which besides the monomers specifically mentioned no further monomers are present, i.e. in these embodiments the total amount of the monomers specifically mentioned is 100 mole %.

The weight average molecular weight $M_w$ of the polyacrylamides to be manufactured is selected by the skilled artisan according to the intended use of the polyacrylamides. For many applications high molecular weights are desirable. A high molecular weight corresponds to a high intrinsic viscosity (IV) of the polyacrylamides. In one embodiment of the invention, the intrinsic viscosity may be at least 15 deciliter/gram (dL/g). In one embodiment of the invention, the intrinsic viscosity is from 30 to 45 dL/g.

The numbers mentioned relate to the measurement with an automatic Lauda iVisc® LMV830 equipped with an Ubbelohde capillary tube and automatic injection. For the measurements an aqueous solution of the polymers to be analyzed was prepared having a concentration of 250 ppm. The pH was adjusted at 7 by means of a buffer and the solution comprised additionally 1 mol/l of NaCl. Further four dilutions were done automatically. The viscosity at five different concentrations was measured at 25° C. with. The IV value [dL/g] was determined in usual manner by extrapolating the viscosities to infinite dilution. The error range is about ±2 dL/g.

Manufacturing Site and Site-of-Use

The process according to the present invention is carried out at least at two different locations, a manufacturing site (also "location A") and a site-of-use (also "location B"), and includes transporting an aqueous polyacrylamide concentrate from location A to location B.

At the manufacturing site, the aqueous polyacrylamide concentrates are manufactured in suitable plants and from there, the aqueous polyacrylamide concentrates are distributed to one or more than one sites-of-use.

A "site-of-use" (Location B) is a location at which the aqueous polyacrylamide concentrates are used. At the "site-of-use, the aqueous polyacrylamide concentrate is removed from the transport unit and used for any desired purpose. In one embodiment, the aqueous polyacrylamide concentrate may be used as such. Alternatively, the concentrate may be diluted with an aqueous liquid and/or formulated with further components.

Subterranean, oil-bearing reservoirs typically extend over a large area. Length and width of a subterranean, oil-bearing reservoir may be up to several hundred kilometers. For producing oil from such subterranean, oil-bearing reservoirs typically many oil wells, injection wells as well as production wells, are distributed over the subterranean reservoir. Similarly, regions comprising valuable minerals such as ores or oil sands may also extend over a large area and individual mines may be distributed in the mining area.

In one embodiment, the site-of-use (Location B) may be at an oil and/or gas well to be treated with polyacrylamides. Examples comprise oil wells into which aqueous polyacrylamide solutions are injected in course of enhanced oil operations, production wells whose productivity is enhanced by injection of fracturing fluids comprising polyacrylamides as friction reducer or as thickener, or drilling fluids which are used in course of drilling oil wells.

In one embodiment, the aqueous polyacrylamide concentrates may be diluted with an aqueous fluid at the "site-of-use" and the diluted solution distributed by pipelines to their final destination, for example different oil wells. In another embodiment, the aqueous concentrates may be metered directly into a pipeline which transports an aqueous fluid to the final destination, for example an oil well. The transport in the pipeline typically is sufficient to fully dissolve the concentrate in the aqueous fluid.

In the field of mining, a site-of-use may be a location at or close to a tailings ponds in which mineral tailings are dewatered using aqueous polyacrylamide solutions. In one embodiment of the invention the site-of-use may be a location for the treatment of red mud, a by-product of the Bayer process for manufacturing aluminium.

In other embodiments, the site of use may be at a paper production site, at sewage works, at seawater desalination plants or at sites for manufacturing agricultural formulations.

The manufacturing site (also "location A") is apart from the site-of-use.

In one embodiment, the manufacturing site may be a fixed chemical plant apart from the site(s)-of-use.

In a preferred embodiment of the invention, the manufacturing site is a local hub which provides a plurality of different sites-of-use with aqueous polyacrylamide concentrates. In an embodiment, such a local hub is located at a central point close to the sites of use having good transport connections in order to ensure easy and economic supply with raw materials.

In one embodiment, the manufacturing site may be at a central point over a subterranean, oil-bearing formation or at a central point in between different subterranean, oil-bearing formations and from such manufacturing site a plurality of oil wells to be treated is provided with aqueous polyacrylamide concentrates for further processing.

In another embodiment, the manufacturing site is at a central point in a mining area and from such manufacturing site a plurality of tailing ponds is provided with aqueous polyacrylamide concentrates for further processing.

The distance between the manufacturing site and the site(s)-of-use is not specifically limited. Generally, in order to limit the costs of transporting the aqueous polyacrylamide concentrates, the manufacturing site should be located close to the site(s)-of-use or at least not too far apart from the site(s)-of-use. Having said that, the abovementioned dimensions of mining areas or subterranean, oil-bearing formations should be kept in mind. So, even when the manufacturing site is a local hub on an oilfield as outlined above, the local hub and the sites-of-use may be apart from each other up a few hundred kilometers.

By the way of example, the distance between the manufacturing site and the site(s)-of-use may range from 1 to 1000 km, in particular from 10 km to 300 km, for example from 10 to 150 km or from 20 km to 100 km.

Modular Plant

While it is possible to perform the process of providing polyacrylamide concentrates in fixed plants, it is preferred to perform the in a modular manner using relocatable units.

"Relocatable unit" means that the unit is transportable basically as a whole and that is it not necessary to disassemble the entire unit into individual parts for transport. Transport may happen on trucks, railcars, ships and/or planes.

In one embodiment, such modular, relocatable units are containerized units which may be transported in the same manner as closed intermodal containers for example on trucks, railcars or ships. Intermodal containers are large standardized (according to ISO 668) shipping containers, in particular designed and built for intermodal freight transport. Such containers are also known as ISO containers. Such ISO containers may have external dimensions of a height of ~2.59 m, a width of ~2.44 m and a length of ~6.05 m. Larger ISO containers have external dimensions of a height of ~2.59 m, a width of ~2.44 m and a length of ~12.19 m, or of a height of ~2.59 m, a width of ~2.49 m and a length of ~13.72 m, or of a height of ~2.90 m, a width of ~2.59 m and a length of ~16.15 m. There are of course other standards, for example units having modular dimensions of 12 feet (~3.66 m)×12 feet (~3.66 m)×12 feet (~3.66 m) or multiples thereof, e.g. 12 (~3.66 m)×12 (~3.66 m)×48 (~14.63 m).

In another embodiment, the relocatable units may be fixed on trucks or on trailers. With other words, for such relocatable units not a container or something similar is deployed, but the entire truck or the trailer including the unit in its loading spaces is deployed. The trucks or trailers advantageously also function as platform for the units on the ground. Also, two or more different units may be mounted together on a truck or trailer.

The relocatable units are combined at the manufacturing site, thereby obtaining a modular production plant making polyacrylamide concentrates from polyacrylamide powders.

Such a modular construction using relocatable units provides the advantage, that the plants may be easily relocated if aqueous polyacrylamide concentrates are no longer needed at one location but at another location.

By the way of example, in enhanced oil recovery aqueous polyacrylamide solutions are injected into a subterranean, oil-bearing formations through one or more than one injection wells sunk into the formation. Such an injection may continue for months or even years.

However, at some point in time no further oil production is possible. The modular plant may then be easily relocated to another location, for example to another oilfield.

Step [1]—Mixing a Polyacrylamide Powder with an Aqueous Liquid

In course of step [1] of the process, a polyacrylamide powder is mixed with an aqueous liquid by means of a mixing unit, thereby obtaining an aqueous polyacrylamide concentrate having a concentration from 1% to 14.9% by weight of polyacrylamides, relating to the total of all components of the aqueous polyacrylamide concentrate, preferably from 3.1% to 14.9% by weight. In one embodiment of the invention, the aqueous polyacrylamide concentrate has a concentration from 1% by weight to 10% by weight, preferably from 1% to 8% by weight, for example from 2% to 7% by weight. In another embodiment of the invention, the aqueous polyacrylamide concentrate has a concentration from 3.1% by weight to 10% by weight, preferably from 4% by weight to 8% by weight. In further embodiments, the concentration is from 3.1% by weight to 7% by weight, for example from 4% by weight to 6% by weight. Step [1] is carried out at a manufacturing site (also "location A") apart from the site-of-use (also "location B").

The term "polyacrylamide powder" shall mean that the polyacrylamide product used for the process comprises particles of polyacrylamides, such as for example beads or granules, and basically is free-flowing. It is known in the art to manufacture such polyacrylamide powders by drying aqueous polyacrylamide gels obtained from gel polymerization or bead polymerization. However, it is also known in the art, that also "dry" polyacrylamide powders usually comprise certain amounts of water. For example, polyacrylamide powders may comprise up to 30% by weight of water and are still free-flowing powders. In particular, the amount of water of polyacrylamide powders to be used for the present invention may be from 5 to 15% by weight of water, relating to the total of polyacrylamide and water. So, the term "polyacrylamide powders" shall not be limited to water-free powders but shall also include powders comprising some water.

The term "concentrate" as used in the context of the present invention simply is used to distinguish the concentrates from diluted polyacrylamide solutions. Keeping the concentration and the molecular weights of the polyacrylamides to be used in mind, the concentrates typically are viscos solutions or (soft) solids. In other words, the concentrates according to the present invention may be characterized—depending on their viscosity—as solutions or as solid solutions. In general, the concentrate is pumpable.

The aqueous polyacrylamide concentrates of the present invention are homogeneous. The term should be understood as "substantially homogeneous", so minor variations of polymer density or polymer concentration in the concentrate may be possible.

As already shown above, suspensions or emulsions of polyacrylamides in water or in oil are known in the art. Such products are typically made with the aid of a surfactant, a dispersant or a partitioning agent and are heterogeneous products. Such heterogeneous products (which comprise at least two different phases) are not subject of the present invention.

Said heterogeneous products emulsions or suspensions typically have a relatively low viscosity, so that they may be easily pumped. However, also such suspended particles require some time for hydration. Without this hydration time, they do not have full performance. The homogeneous aqueous polyacrylamide concentrates according to the present invention are less easily pumped, however, their mode of action is improved.

Polyacrylamide concentrates of the preferred embodiment, i.e. having a concentration from 3.1 to 14.9% by weight, are typically (soft) solids, although they may be viscos solutions in special cases.

The aqueous liquid for making the aqueous polyacrylamide concentrate comprises water. The term "water" includes any kind of water such as desalinated water, fresh water or water comprising salts, such as brines, sea water, formation water, produced water or mixtures thereof. Besides water, the aqueous liquid may comprise organic solvents miscible with water, however the amount of water relating to the total of all solvent should be at least 70% by weight, preferably at least 90% by weight, more preferably at least 95% by weight. In one preferred embodiment, the aqueous liquid comprises only water as solvent. Furthermore, the aqueous liquid may optionally also comprise additives such as for example surfactants, complexing agents, bases, acids and the like.

Besides the aqueous liquid and the polyacrylamides also further components may be present in the aqueous polyacrylamide concentrates. Examples of such further components comprise additives such as for example surfactants, complexing agents, bases, or acids. Such additives may be used to modify the properties of the aqueous polyacrylamide concentrates. The skilled artisan may select the amount according to his/her needs. In general, the ratio of such additives should not be more than 1:1 (wt./wt.) relating to the polyacrylamide.

In one embodiment of the invention, the homogeneous aqueous concentrate comprises 3.1 wt. % to 10 wt. % of polyacrylamides and 85 wt. % to 96.9 wt. % of an aqueous liquid, preferably of water, in particular from 3.1 wt. % to 10 wt. % of polyacrylamides and 90 wt. % to 96.9 wt. % of water. In another embodiment, the homogeneous aqueous concentrate comprises 4 wt. % to 6 wt. % of polyacrylamides and 89 wt. % to 96 wt. % of an aqueous liquid, preferably of water, in particular from 4 wt. % to 6 wt. % of polyacrylamides and 94 wt. % to 96 wt. % of water.

The concentrates are manufactured by mixing a polyacrylamide powder with an aqueous liquid by means of a mixing unit. Basically, any kind of mixing unit capable of mixing solids with liquids may be used. Preferably, solid-liquid mixing devices generating only low shear-energies should be used. For example, extruders or kneaders may be used. Also, stirrers generating only low shear-energies may be used, for example stirrers with half-moon geometry. Furthermore, stirrers with a planetary drive may be used, i.e. stirrers rotating around an axis and simultaneously the axis is carrying out a circular motion. Tumblers like those used for concrete mixing may be also used.

In one embodiment of the invention, a kneader may be used for mixing. Examples of suitable kneaders are disclosed in WO 2006/034853 A1 and the literature cited therein. Suitable kneaders are also commercially available.

The mixing unit preferably is a relocatable mixing unit. It may be mounted into a container and/or trailer or on a truck and can easily transported to the site-of-manufacture.

Often, the mixing device used may be sufficient to obtain a homogeneous aqueous polyacrylamide concentrate as defined above. So, in one embodiment of the invention, the polyacrylamide powder is mixed with the aqueous liquid in the mixing device until a substantially homogeneous product is obtained.

In another embodiment of the invention, the process comprises an additional step [1b] of homogenizing to be carried out after the mixing step [1] as described above.

If the process is such a 2-step process, it is possible to add the entire amount of aqueous liquid necessary for achieving the desired concentration already in course of the mixing step [1] or it is possible the add only a part of the amount in step [1] and the remainder in course of step [1b].

If the aqueous polyacrylamide composition has a viscosity which is not too high so that stirring is possible, step [1b] may be carried out by means of a stirred vessel. Naturally, such an embodiment is suitable in particular for more dilute compositions, such as the aqueous polyacrylamide concentrate comprises 1% to 2% by wt. of polyacrylamides.

Other embodiments include the use of static mixers. In one embodiment, the mixture may be circulated using circulation pumps. Optionally, the loop may comprise one or more static mixers. Further examples include tumbling, shaking or any mixing method known to skilled in the art for highly viscous liquids, for example using progressive cavity pumps.

Step [1b] may also be combined with the transport step [2]. In one embodiment the transport unit, for example a truck may comprise a rotating drum. Trucks comprising rotating drums are known on the art for transporting concrete. Homogenization may be affected in course of transport by rotating the drum.

Step [2] Transport of the Aqueous Polyacrylamide Concentrate

In course of step [2], the aqueous polyacrylamide concentrate is transported from the manufacturing site (location A) to the site-of-use (location B).

For transport, a suitable transport unit is used. The transport unit may have a volume from 1 $m^3$ to 40 $m^3$, in particular 5 $m^3$ to 40 $m^3$, preferably 10 $m^3$ to 30 $m^3$, and for example 20 $m^3$ to 30 $m^3$, or from 15 to 25 $m^3$. Examples of suitable transport units comprise vessels comprising at least one opening, tank containers, or tipping vessels.

The term "transport unit" shall include separate transport units such as vessels, containers, for example ISO containers or intermediate bulk containers, which are loaded on suitable transport means for transport, for example on trailers, container cars or ships. The transport means may transport one single transport unit or a plurality of transport units. The term "transport unit" furthermore includes transport units in which the transport compartment is permanently fixed on the transport means, such as for example tank trucks or tanks cars.

The transport may be carried out by any kind of transport means suitable for transporting the transport unit, for example by trucks, railcars or ships. In one embodiment, the transport is carried out by trucks. The transport unit may also be fixed on a truck. In one embodiment, the transport unit may be an ISO tank container. Typical dimensions of ISO containers have already been mentioned above.

In another embodiment, tanks fixed on a truck may be used. In one embodiment, the tank comprises an outlet opening at the rear end of the truck and for supporting removal of the contents the tank may be tilted. In another embodiment, the tank comprises an outlet opening at the bottom side of the tank. Additionally, the tank may comprise a conus at the bottom side of the tank and the outlet opening in located at the lower end of the conus. The tank may also be rotatable, so that the concentrate may become homogenized in course of transport. For example, a concrete mixer may be used for transporting the concentrate.

Filling the transport unit with the aqueous polyacrylamide concentrate may be carried out by pumping the concentrate into the transport unit.

The transport time, i.e. the time for transporting the transport unit filled with aqueous polyacrylamide concentrate may be very different, depending on the distance between the locations A and B. It may range from minutes to several days, for example from 1 h to 28 days, in particular from 2 hours to 14 days, in particular 5 hours to 7 days.

Step [3] Removal of the Aqueous Polyacrylamide Concentrate from the Transport Unit In course of step [3] the aqueous polyacrylamide concentrate is removed from the transport unit. Step [3] is carried out at location B, i.e. the site-of-use.

Basically, removing the aqueous polyacrylamide concentrate may be carried out by any kind of technology. The details depend on the specific design of the transport unit, the kind of concentrate, in particular its viscosity, and the connected downstream processing equipment.

Preferably, the aqueous polyacrylamide concentrate may be removed by means of a pump, for example a progressive cavity pump. Removal may be supported by applying pressure onto the transport unit, in particular by means of gas pressure. Furthermore, removal may also be supported—depending on the construction of the transport units—by tilting the transport unit.

After removal form the transport unit, the aqueous polyacrylamide concentrate may be directly used. In other embodiments, the aqueous polyacrylamide concentrate is transferred into suitable storage units, for example storage tanks for temporarily storing it before use.

Use of the Aqueous Polyacrylamide Concentrates

The aqueous polyacrylamide concentrates manufactured according to the present invention may be used for various purposes, for example for mining applications, oilfield applications, water treatment, waste water cleanup, paper making or agricultural applications.

For application, the aqueous polyacrylamide concentrates may be further diluted at the site-of-use (location B) thereby obtaining diluted aqueous polyacrylamide solutions. In other embodiments, the aqueous polyacrylamide concentrates advantageously may be used as such without further dilution. Concentrates and/or solutions may also be formulated with further components. Further components may be selected by the skilled artisan according to the intended use.

Examples of oilfield processes in which the aqueous polyacrylamide concentrates and/or solutions manufactured according to the present invention may be used include enhanced oil recovery, oil well drilling, the use as viscosifier for various purposes or the use as friction reducers, for example friction reducers for fracturing fluids.

Process of Treating Subterranean Formations

In a preferred embodiment of the invention, the aqueous polyacrylamide concentrates may be used for treating subterranean, oil- and/or gas bearing formations.

Accordingly, the present invention also relates to a process of treating subterranean, oil and/or gas bearing formations by injecting an aqueous treatment fluid comprising at least one polyacrylamide through at least one wellbore into the formation comprising at least the following steps:

[1] Mixing a polyacrylamide powder at a manufacturing site ("location A") with an aqueous liquid by means of a mixing unit, thereby obtaining a homogeneous aqueous polyacrylamide concentrate having a concentration from 1% to 14.9% by weight of polyacrylamides, relating to the total of all components of the homogeneous aqueous polyacrylamide concentrate,

[2] transporting said concentrate in a transport unit from the manufacturing site ("location A") to a wellbore-site ("location B"),

[3] removing the concentrate from the transport unit at the wellbore-site ("location B"),

[4] mixing the homogeneous aqueous polyacrylamide concentrate with at least an aqueous base fluid at the wellbore-site thereby obtaining an aqueous treatment fluid, and

[5] injecting said aqueous treatment fluid into a subterranean, oil and/or gas bearing formation through at least one wellbore.

Preferably, the homogeneous aqueous polyacrylamide concentrate has a concentration from 3.1% to 14.9% by weight of polyacrylamides, relating to the total of all components of the aqueous polyacrylamide concentrate. More preferred concentrations have already been disclosed above and we refer to said passages.

Basically, the process may be any kind of wellbore treatment in which aqueous treatment fluids are injected through a wellbore into a formation. Examples of such processes comprise enhanced oil recovery, conformance control processes or hydraulic fracturing processes.

The process steps [1], [2], and [3] have already been described above and we refer to the respective paragraphs of the specification.

Step [4] is carried out at the wellbore-site. An aqueous treatment fluid for treating subterranean formations is provided by mixing the aqueous polyacrylamide concentrate as described above with at least an aqueous base fluid and optionally further components. The term "wellbore site" shall include, that mixing the aqueous treatment fluid is not carried out adjacent to a wellbore but that the aqueous treatment fluid is transported from the location of mixing to the wellbore by pipeline.

Examples of aqueous base fluids comprise fresh water, brines, sea water, formation water treated water or mixtures thereof. The salinity of the water may be—for example— from 500 ppm to 300,000 ppm total dissolved solids (TDS), for example from 1,000 ppm to 100,000 ppm.

Examples of additional components which may optionally be used comprise biocides, complexing agents, corrosion inhibitors, scale inhibitors, iron control agents or clay control agents. The skilled artisan may select such further compounds depending on the envisaged function of the treatment fluid. Such additional components may be added separately to the aqueous treatment fluid or they may be an additional component of the aqueous polyacrylamide concentrate, i.e. they may become added already in course of manufacturing the aqueous polyacrylamide concentrate.

Basically, mixing of the components of the aqueous treatment fluid may be carried out by any kind of mixing technology, for example by means of mixing vessels or by means of blenders.

In course of step [5], the aqueous treatment fluid is injected into a subterranean, oil and/or gas bearing formation through at least one wellbore.

Hydraulic Fracturing

In one embodiment of the invention, the process is a process of hydraulic fracturing.

Hydraulic fracturing involves injecting fracturing fluid through a wellbore and into a formation under sufficiently high pressure to create fractures, thereby providing channels through which formation fluids such as oil, gas or water, can flow into the wellbore and thereafter be withdrawn. Fracturing fluids are designed to enable the initiation or extension of fractures and the simultaneous transport of suspended proppant into the fracture to keep the fracture open when the pressure is released.

In hydraulic fracturing operations it is important to ensure that the proppants are transported with the fracturing fluid into the formation and that they do not settle. Said effect can be achieved by using a thickened fluid having a high viscosity. In another embodiment of hydraulic fracturing, also known as "slickwater fracturing", fluids having only a low viscosity are used. Such fluids mainly comprise water. In order to achieve proppant transport into the formation, the pumping rates and the pressures used are significantly higher than for high-viscosity fluids. The high flow ensures proppant transport. On the other hand, the turbulent flow of the fracking fluid causes significant energy loss due to friction. In order to avoid or at least minimize such friction losses, friction reducers, for example high molecular weight polyacrylamides may be used which change turbulent flow to laminar flow.

Accordingly, in one embodiment of the invention, the process of treating subterranean formations is a process of slickwater fracturing, wherein the aqueous treatment fluid is an aqueous fracturing fluid and the polyacrylamide serves as friction reducer, wherein step [4] comprises providing an aqueous fracturing fluid by mixing at least an aqueous base fluid and the aqueous polyacrylamide concentrate, and wherein at least a part of the fracturing fluid additionally comprises a proppant, and step [5] comprises injecting said aqueous fracturing fluid through the wellbore into the subterranean formation at a pressure sufficient to penetrate into the formation and to initiate or extend fractures in the formation.

Proppants are small hard particles which cause that fractures formed in course of the process do not close after removing the pressure. Suitable proppants and suitable amounts thereof are known to the skilled artisan. Examples of proppants include naturally-occurring sand grains, resin-coated sand, sintered bauxite, glass beads, or ultra-light-weight polymer beads.

At least a part of the aqueous fracturing fluid provided in course of step [4] comprises a proppant. Of course, the entire amount of fracturing fluid may comprise a proppant. Also, the amounts of proppants in the fluid may be varied in course of the process. By the way of example, the process comprises embodiments in which the process starts with injecting an aqueous fracturing fluid comprising no proppants followed by the injection of an aqueous fracturing fluid comprising proppants.

Besides the aqueous base fluid, optionally the proppants and the polyacrylamide friction reducer, the aqueous fracturing fluid may optionally comprise further components. Examples of such additional components comprise biocides, corrosion inhibitors, scale inhibitors, iron control agents and clay control agents. The skilled artisan may select such further depending on the needs of the frac job. Such additional components may be added separately to the aqueous fracturing fluid or they may be an additional component of the aqueous polyacrylamide concentrate, i.e. they may be added already in course of manufacturing the aqueous polyacrylamide concentrate.

In slickwater fracturing the aqueous fracturing fluid typically comprises no viscosifiers. So, besides the polyacrylamides used as friction reducer which may have a slight viscosifying effect, no further thickening components such as thickening surfactants or thickening polymers should be used, although the use of such thickening components may not absolutely be ruled out.

The concentration of the polyacrylamide friction reducers in the aqueous fracturing fluid is selected by the skilled artisan according to his/her needs. Usually, it is in the range from 20 ppm to 600 ppm, in particular from 20 ppm to 300 ppm, for example from 125 ppm to 250 ppm of polyacrylamides relating to the total of all components of the aqueous fracturing fluid except the proppants. The amount of the aqueous polyacrylamide concentrate is selected accordingly.

The aqueous fracturing fluid is made by mixing the components of the fracturing fluid with each other. In order to be effective as friction reducer, the aqueous polyacrylamide concentrate needs to dissolve in the aqueous fluid thereby obtaining a solution of polyacrylamides in in the aqueous fluid. Basically, mixing of the components of the fracturing fluid may be carried out by any kind of technology.

It is known in the art, to use so-called "blenders" for mixing the components of the fracturing fluid. Such blenders may be fixed on a truck, mounted on a trailer or mounted in a skid and are commercially available. If polyacrylamides are used as friction reducers, it is known in the art to meter them into the blender as inverse emulsion or as aqueous solution.

Advantageously, the aqueous polyacrylamide concentrates to be used for the process of slickwater fracturing according to the present invention may be metered directly into the blender without previous dilution or any other kind of processing. They dissolve very quickly in the aqueous base fluid, thereby developing the effect of friction reduction.

In another embodiment, the present invention also relates to a process of hydraulic fracturing, wherein the treatment fluid is a viscosified aqueous fracturing fluid comprising in which the polyacrylamide serves as viscosifier, and wherein
step [4] comprises providing an aqueous fracturing fluid by mixing at least an aqueous base fluid and the aqueous polyacrylamide concentrate, and wherein at least a part of the fracturing fluid additionally comprises a proppant, and
step [5] comprises injecting said aqueous fracturing fluid through the wellbore into the subterranean formation at a pressure sufficient to penetrate into the formation and to initiate or extend fractures in the formation.

In contrast to the method of slickwater fracturing, the concentration of the polyacrylamides in the aqueous fracturing fluid here is such, that they significantly increase the viscosity of the aqueous fracturing fluid, thereby enabling proppant transport and preventing settling of the proppants. For example, the concentration may be in the range from more than 600 ppm to 20,0000 ppm, in particular from 1,000 ppm to 10,000 ppm, for example from 2,000 ppm to 7,500 ppm of polyacrylamides relating to the total of all components of the aqueous fracturing fluid except the proppants. The amount of the aqueous polyacrylamide concentrate is selected accordingly.

Mixing in course of step [4] may be carried out in the same manner as detailed above, preferably using a blender. Step [5] is carried out at an injection rate which basically avoids turbulent flow.

Enhanced Oil Recovery

In another embodiment of the invention, the process of treating subterranean formations is a process of enhanced oil recovery.

Accordingly, the present invention also relates to a process of enhanced oil recovery, wherein the subterranean formation is penetrated by at least one injection well and at least one production well apart from each other, wherein step [5] comprises injecting said aqueous treatment fluid through at least one injection well into the subterranean formation, wherein the aqueous treatment fluid flows in the formation towards at least one production well thereby mobilizing oil and withdrawing crude oil from the subterranean through at least one production well.

For enhanced oil recovery, a homopolymer of acrylamide may be used, however preferably water-soluble copolymers comprising at least 10%, preferably at least 20%, and more preferably at least 30% by weight of acrylamide and at least one additional water-soluble, monoethylenically unsaturated monomer different from acrylamide are used. Suitable water-soluble comonomers have already been mentioned above and we refer to the disclosure above.

In one embodiment, water-soluble comonomers may be selected from water-soluble, monoethylenically unsaturated monomers comprising at least one acid group, or salts thereof. The acidic groups are preferably selected from the group of —COOH, —SO$_3$H and —PO$_3$H$_2$ or salts thereof. Preference is given to monomers comprising COOH groups and/or —SO$_3$H groups or salts thereof. Suitable counterions have already been mentioned above. Examples of such comonomers comprise acrylic acid, methacrylic acid, crotonic acid, itaconic acid, maleic acid, fumaric acid, vinylsulfonic acid, allylsulfonic acid, 2-acrylamido-2-methylpropanesulfonic acid (ATBS), 2-methacrylamido-2-methylpropane-sulfonic acid, 2-acrylamidobutanesulfonic acid, 3-acrylamido-3-methylbutane-sulfonic acid, 2-acrylamido-2,4,4-trimethylpentanesulfonic acid, vinylphosphonic acid, allylphosphonic acid, N-(meth)acrylamidoalkylphosphonic acids and (meth)acryloyloxyalkyl-phosphonic acids.

In a preferred embodiment, acrylic acid and/or ATBS or salts thereof may be used as comonomers.

In such copolymers, the amount of acrylamide usually is from 20% by wt. to 90% by wt. and the amount of acrylic acid and/or ATBS or salts thereof is from 10% by wt. to 80% by wt., relating to the amount of all monomers in the copolymer. Preferably, the amount of acrylamide is from 60% by wt. to 80% by wt. and the amount acrylic acid and/or ATBS or salts thereof is from 20% by wt. to 40% by wt.

In another embodiment, the copolymers to be used for enhanced oil recovery comprise at least one water-soluble, monoethylenically unsaturated monomer comprising at least one acid group, or salts thereof, preferably acrylic acid and/or ATBS or salts thereof, and at least one associative monomer. Examples of associative monomers have already been disclosed above. In one embodiment, at least one associative monomer of the general formula (III), (IV), or (V) is used, preferably at least one associative monomer of the general formula (V). Preferred embodiments of the associative monomers (III), (IV), and (V) have already been disclosed above and it is explicitly referred to that description.

In such polyacrylamides, the amount of acrylamide usually is from 40% by wt. to 89.9% by wt., the amount of acrylic acid and/or ATBS or salts thereof is from 10% by wt. to 59.9%, and the amount of associative monomer is from 0.1 to 5% by wt., relating to the amount of all monomers in the copolymer.

In one embodiment, the polyacrylamides for EOR comprise 45% to 55% by weight of acrylamide, 0.1 to 5%, preferably 0.1 to 2% by weight of at least one associative monomer of the general formula (V) mentioned above, including the preferred embodiments, and 40 to 54.9% by weight of acrylic acid or salts thereof.

For the method of enhanced oil recovery, at least one production well and at least one injection well is sunk into the mineral oil deposit. In general, a deposit will be provided with a plurality of injection wells and with a plurality of production wells. An aqueous fluid is injected into the mineral oil deposit through the at least one injection well, and mineral oil is withdrawn from the deposit through at least one production well. By virtue of the pressure generated by the aqueous fluid injected, called the "polymer flood", the mineral oil flows in the direction of the production well and is produced through the production well. In this context, the term "mineral oil" does not of course just mean a single-phase oil; instead, the term also encompasses the customary crude oil-water emulsions.

The aqueous injection fluid comprises an aqueous base fluid such as freshwater or water comprising salts, such as seawater or formation water. For use in enhanced oil recovery, the base fluid is mixed with the polyacrylamides and optionally further components. Examples of further components include biocides, stabilizers, free-radical scavengers, initiators, surfactants, cosolvents, bases and complexing agents. For mixing the aqueous injection fluid, either the aqueous polyacrylamide concentrate may be used or the aqueous polyacrylamide concentrate may be diluted in a first step with additional aqueous liquid and thereafter used for making the aqueous injection fluid.

For use in the enhanced oil recovery process, the aqueous polyacrylamide concentrates are mixed with the aqueous base fluid and optionally further components. In one embodiment, such mixing may be carried out by means of suitable mixing means, for example static mixers or mixing vessels. In another embodiment, the aqueous polyacrylamide concentrates are injected into the pipeline(s) which transport(s) the aqueous injection fluid to the injection well(s) at the desired concentration. Such pipelines may have a length of up to some kilometers. It has been found that the time needed for flowing through such pipeline often is sufficient for complete dissolution of the concentrate in the fluid. Of course, combinations are possible. By the way of example, the pipeline may comprise mixing elements such as static mixers.

The final concentration of the polyacrylamide in the injection fluid is fixed such that the aqueous formulation has the desired viscosity for the end use. The viscosity of the formulation should generally be at least 5 mPas (measured at 25° C. and a shear rate of 7 $s^{-1}$), preferably at least 10 mPas.

Advantages of the Process According to the Present Invention

The present invention provides advantages as compared to prior art. As outlined above, dissolution units, including modular units for dissolving polyacrylamide powders for use in the oilfield have been suggested. Such state-of-the-art hydration facilities for polyacrylamides are typically located at the site-of-use, adjacent to the application point (i.e. adjacent to an oil well). While this works well for delivery of the fluid, the processing unit in the field is restricted in its ability to hand issues related to health, safety, environment and reliable processing. This due to the requirements to be mobile and reduced size. Using a dedicated manufacturing-site (apart from the site-of-use) allows more advanced engineering controls and a better controlled environment, such as to control dust or humidity.

In the present invention, manufacture of the aqueous polyacrylamide concentrates is bundled at one manufacturing plant which preferably is a modular plant located at a central point on an oilfield or in a mining area. The complicated process steps are bundled at one central manufacturing site.

The invention is illustrated in detail by the examples which follow.

The following polyacrylamide powders were used for the tests.

Polyacrylamide Powder 1:

Copolymer comprising 69.4 wt. % (75.0 mol %) of acrylamide and 30.6 wt. % (25 mol %) of sodium acrylate stabilized with 0.25 wt. % Na-MBT relating to polymer A 5 L beaker with magnetic stirrer, pH meter and thermometer was filled with 1600 g of distilled water, 702.04 g of sodium acrylate (35% by weight in water), and 1071.69 g of acrylamide (52% by weight in water). Then 10.5 g of diethylenetriaminepentaacetic acid pentasodium salt (Trilon C; 5% by weight in water), and 4 g of the stabilizer sodium 2-mercaptobenzothiazole (Na-MBT; 50% by weight in water) were added. After adjustment to pH 6.4 with sulfuric acid (20% by weight in water) and addition of the rest of the water to attain the desired monomer concentration of 23% by weight (total amount of water 1690.08 g minus the amount of water already added, minus the amount of acid required), the monomer solution was adjusted to a temperature of approx. −3° C. The solution was transferred to a Dewar vessel, the temperature sensor for the temperature recording was inserted, and the flask was purged with nitrogen for 45 minutes. The polymerization was initiated at 0° C. with 21 g of a 10% aqueous solution of 2,2'-azobis (2-methylpropionamidine) dihydrochloride (Wako V-50; 10 h $t_{1/2}$ in water 56° C.), 1.75 g of t-butyl hydroperoxide (1% by weight in water) and 1.05 g of a 1% sodium sulfite solution. With the onset of the polymerization, the temperature rose to 54.6° C. within about 63 min. A solid polymer gel block was obtained.

After polymerization, the gel block was incubated 4 hours at 60° C. Thereafter, the gel block was comminuted with a meat grinder. The particles were dried for two hours at 55° C. in a fluid bed dryer. After drying, the dried particles were grinded in a lab mill and filtered with a 1 mm sieve. A polyacrylamide powder with an active content of 94.6% by weight (the remainder being moisture) was obtained.

Polyacrylamide Powder 2:

Copolymer comprising 69.4 wt. % (75.0 mol %) of acrylamide and 30.6 wt. % (25 mol %) of sodium acrylate stabilized with 0.25 wt. % Na-MBT relating to polymer The synthesis was similar to that of the polyacrylamide powder 1, however the gel polymerization was run at a solid content of 30% by weight instead of 23% by weight in the powder 1

A 5 L beaker with magnetic stirrer, pH meter and thermometer was filled with 1100 g of distilled water, 915.71 g of sodium acrylate (35% by weight in water), and 1397.85 g of acrylamide (52% by weight in water). Then 10.5 g of diethylenetriaminepentaacetic acid pentasodium salt (Trilon C; 5% by weight in water), and 5.2 g of the stabilizer sodium 2-mercaptobenzothiazole (Na-MBT; 50% by weight in water) were added.

After adjustment to pH 6.4 with sulfuric acid (20% by weight in water) and addition of the rest of the water to attain the desired monomer concentration of 30% by weight (total amount of water 1149.05 g minus the amount of water already added, minus the amount of acid required), the monomer solution was adjusted to a temperature of approx. −3° C. The solution was transferred to a Dewar vessel, the temperature sensor for the temperature recording was inserted, and the flask was purged with nitrogen for 45 minutes. The polymerization was initiated at 0° C. with 21 g of a 10% aqueous solution of 2,2'-azobis(2-methylpropionamidine) dihydrochloride (Wako V-50; 10 h $t_{1/2}$ in water 56° C.), 1.75 g of t-butyl hydroperoxide (1% by weight in water) and 1.05 g of a 1% sodium sulfite solution. With the onset of the polymerization, the temperature rose to 84.4° C. within about 20 min. A solid polymer gel block was obtained.

After polymerization, the gel block was incubated 4 hours at 80° C. Then, the block was comminuted with a meat grinder. The particles were dried for two hours at 55° C. in a fluid bed dryer. After drying, the dried particles were grinded in a lab mill and filtered with a 1 mm sieve. A polyacrylamide with an active content of 95.0 wt. % was obtained.

EXAMPLE 1

Material Used: Polyacrylamide Powder 1

Figure 1:
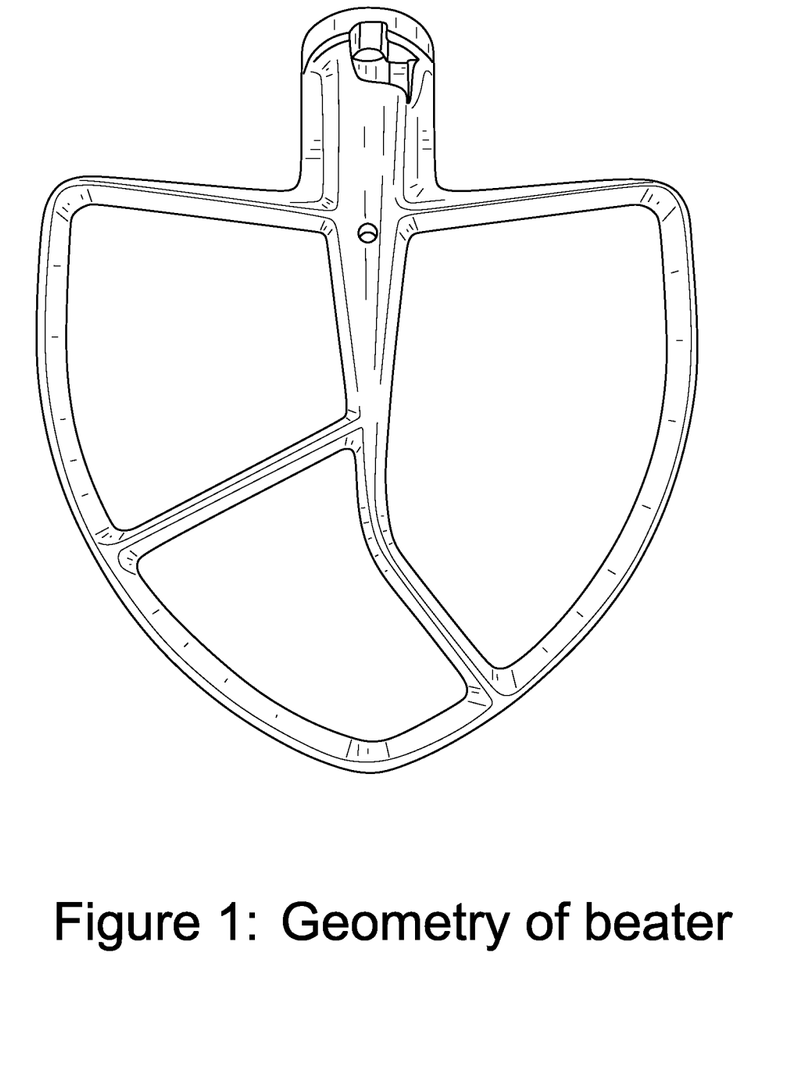

A customary kitchen kneader (Kitchenaid®, 5KSM7580X) was used for mixing the powder. The kitchen kneader comprises a fixed bowl for the goods to be mixed (volume 6.9 l, diameter 0.24 m) and a planetary drive, i.e. the mixing means rotates around an axis and simultaneously the axis carries out a circular motion, so that the entire contents in the bowl is affected by the mixing means. As mixing means a beater (length 0.16 cm, width 0.14 m) having the geometry as indicated in FIG. 1 was used.

150 g of the Polyacrylamide Powder 1 and 2850 g water comprising a pH 7 buffer were filled and mixed for 6 hours at about 60 rpm. A clear and homogeneous polyacrylamide concentrate comprising 5% by weight of polyacrylamide was obtained.

EXAMPLE 2

Material Used: Polyacrylamide Powder 1

An amount of 284.21 g of water was added into a 600 ml beaker while mixing via an overhead mixer with a 75 mm diameter half-moon propeller. The mixing rate was initially set at 300 rpm. Thereafter 15.79 g of the polyacrylamide powder (i.e. the amount to give a final concentration of 5.0 weight % of polyacrylamides in the concentrate) obtained in course of step 2 was slowly added to the vortex over a few seconds to avoid the formation of lumps. After 5 min, the mixing rate was lowered to 30 rpms for an additional 18 hours.

EXAMPLE 3

Material Used: Polyacrylamide Powder 2

A 5% aqueous polyacrylamide concentrate was obtained in the same manner as shown in example 2.

COMPARATIVE EXAMPLE 1

Inverse emulsion of a copolymer comprising 69.4 wt. % (75.0 mol %) of acrylamide and 30.6 wt. % (25 mol %) of sodium acrylate stabilized with 0.25 wt. % Na-MBT relating to polymer (solids content 23% by weight relating to the total of the inverse emulsion).

A 600 mL beaker with magnetic stirrer, pH meter and thermometer was charged with 150.44 g of sodium acrylate (35% by weight in water), 128.97 g of distilled water, 229.65 g of acrylamide (52% by weight in water), 0.5 g of diethylenetriaminepentaacetic acid penta-sodium salt (Trilon C; 5% by weight in water), and 0.86 g of the stabilizer sodium 2-mercaptobenzothiazole (Na-MBT; 50% by weight in water).

After adjustment to pH 6.4 with sulfuric acid (20% by weight in water), the rest of the water to attain the desired monomer concentration of 23% by weight (total amount of water 138.61 g minus the amount of water already added, minus the amount of acid required) was added. A high 1 L beaker was charged with 12.2 g sorbitan monooleate (Span® 80) and 189.9 g of a high-boiling dearomatized hydrocarbon mixture (Exxsol® D100) was added and stirred with a spatula.

The beaker with the oil solution was fixed in a Silverson high shear mixer. While mixing the oil solution at 4000 rpm, the aqueous solution was poured in quickly. Then, the Silverson high shear mixer is turned up to 8000 rpm for 2 min 48 sec.

The emulsion was transferred to a double jacketed reactor, stirred at 200 rpm and adjusted to the initiation temperature of 10° C. During this time the emulsion was purged with nitrogen (for 60 minutes). The polymerization was drop-wise initiated with 9 g of a 0.1% sodium bisulfite solution and 5 g of 0.1% t-butyl hydroperoxide solution. The initiators were added with a squeezing pump, controlled by hand. When the respective 0.1% solutions were empty, the initiators were changed to 9 g of a 1% sodium bisulfite solution and 5 g of a 1% t-butyl hydroperoxide solution. Thereby, the temperature rose 1° C. per minute up to 40° C., from there the temperature was maintained at 40° C. When the second initiator was added completely, the emulsion was stirred for additional 60 minutes at 40° C. The emulsion was then filtered through a 190 μm filter.

Activation of the Inverse Emulsion

The activation was carried out 24 h prior to use in the Friction Loop experiment. For activation, 97.75 g of the inverse emulsion was poured in a glass beaker and stirred with an over-head stirrer at 650 rpm. With a 5 mL plastic syringe, 2.25 g of a commercially available activator was added at once to the vortex of the inverse emulsion. The mixture was stirred for additional 8 minutes.

Performance as Friction Reducer:

Friction Loop Apparatus

The friction reduction performance of the friction reducing agent was assessed using a Chandler model M5600 friction loop, which circulates fluid through a section of known diameter pipe to determine the effectiveness and longevity of a friction reducing agent added to a test fluid. Fluid in the loop flows from a ~37.8 l (~10 gallon) reservoir through a pump, mass flow meter and then two ~250 cm (10 feet) long sections of pipe before returning to the reservoir to be recirculated. Pressure drop is measured over the two sections of pipe. One is 1.27 cm outer diameter (½ inch), the other is 1.91 cm outer diameter (¾" inch), giving different ranges of Reynolds number.

The friction loop was loaded with 37.85 l (10 gallons) of aqueous test fluid (fresh water or brines). The flow rate was set to 37.85 l per minute (10 gallons per minute) and once a stable, initial pressure was recorded. Thereafter, the friction reducing composition to be tested was injected into the vortex of the fluid reservoir using a plastic syringe.

The injection time was taken as the start of the test (time=0 seconds). The subsequent drop in pressure measured the performance of the friction reducing composition. The pressure data from the 1.27 cm pipe is reported, because it reflected a higher Reynolds number than the 1.91 cm pipe.

Pressure data was converted to friction reduction using the formula:

$$\% \text{ Friction Reduction}(\% \ FR) = \frac{\text{Initial Pressure with no } FR - \text{Pressure with } FR}{\text{Initial Pressure with no } FR}$$

Friction Loop Tests 26.08 g of the aqueous polyacrylamide concentrates obtained in examples 2 and 3 (each having a concentration of 5 wt. % of polyacrylamides) was used for the friction loop testing. This dosage amount corresponds to a final concentration of 35 ppm polymer once diluted in the friction loop with additional fresh water.

The aqueous polyacrylamide concentrate was added directly to vortex of the friction loop mixing tank at time=0, as mentioned in the above description of the Friction Loop.

5.67 ml of the activated inverse emulsion sample (comparative example 1) was directly injected into the vortex of the flow loop mixing tank, to achieve also a final concentration of 35 ppm polymer.

Figure 2:
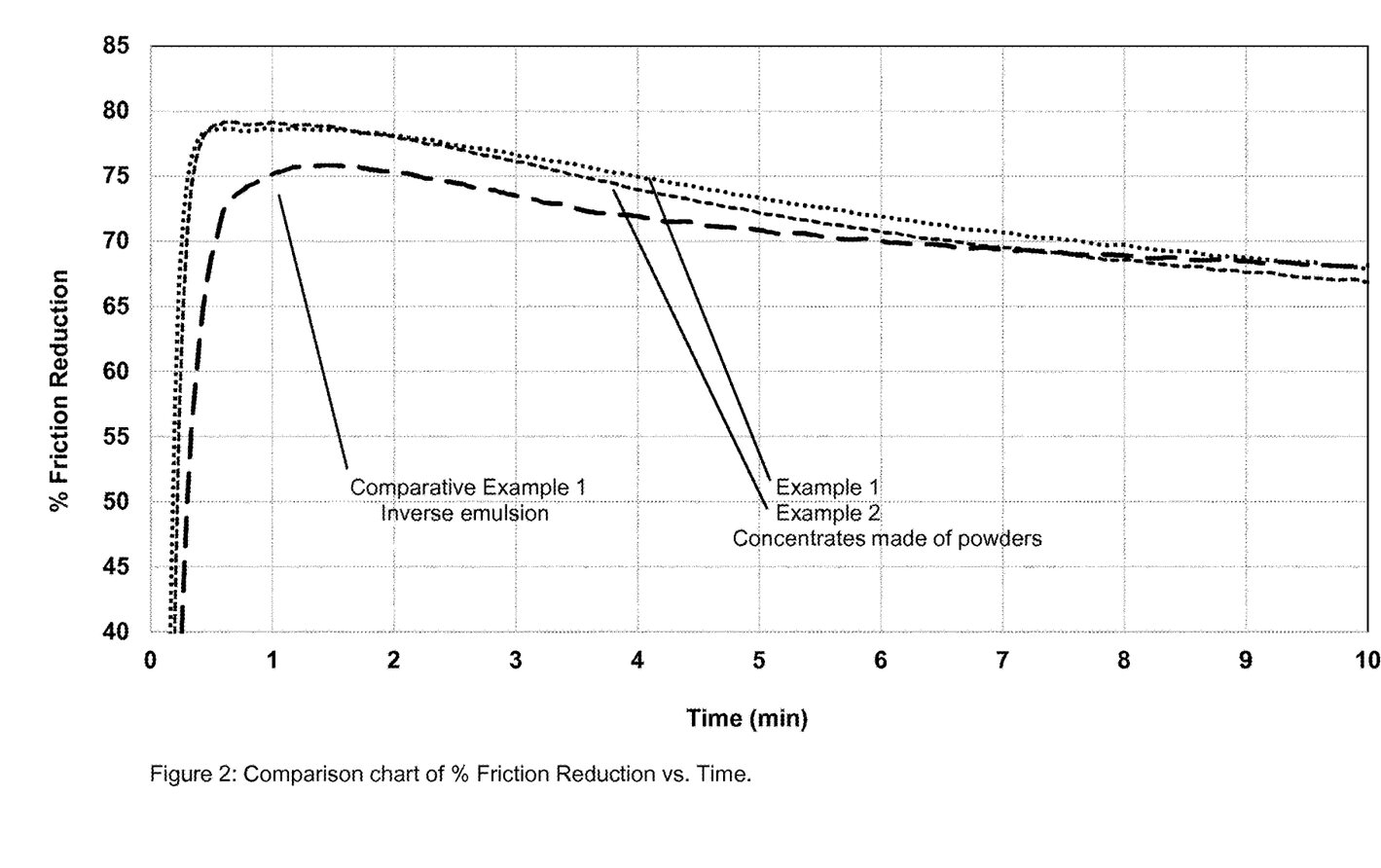

All results (percentage of friction reduction vs. time) are summarized in FIG. 2.

Discussion of the Results Obtained

FIG. 2 shows a comparison of the % Friction Reduction of examples 1 and 2 and of comparative example 1 as a function of time. Each sample was measured individually under the same experimental conditions and at the same effective dosage concentration.

The aqueous polyacrylamide concentrates obtained by dissolution of powder (examples 1 and 2) yielded higher maximum friction reduction, as well as at a faster rate when compared to the inverse emulsion (comparative example 1).

The invention claimed is:

1. A process of providing polyacrylamides comprising at least the following steps
    [1] mixing a polyacrylamide powder at a location A with an aqueous liquid by means of a mixing unit, thereby obtaining a homogeneous aqueous polyacrylamide concentrate having a concentration from 1% to 14.9% by weight of polyacrylamides, relating to the total of all components of the homogeneous aqueous polyacrylamide concentrate,
    [2] filling a transport unit with said homogeneous aqueous polyacrylamide concentrate by pumping the concentrate into the transport unit and transporting said homogeneous aqueous polyacrylamide concentrate in the transport unit from location A to a different location B, wherein the location A is a manufacturing site local hub which provides location B, wherein location B is a plurality of different sites-of-use with said homogeneous aqueous polyacrylamide concentrate,
    [3] removing the homogeneous aqueous polyacrylamide concentrate from the transport unit at the location B.

2. The process according to claim 1, wherein the homogeneous aqueous polyacrylamide concentrate has a concentration of 3.1 to 14.9% by weight of polyacrylamides, relating to the total of all components of the aqueous polyacrylamide concentrate.

3. The process according to claim 1, wherein the homogeneous aqueous polyacrylamide concentrate has a concentration of 3.1 to 10% by weight of polyacrylamides, relating to the total of all components of the homogeneous aqueous polyacrylamide concentrate.

4. The process according to claim 1, wherein the mixing unit comprises a kneader.

5. The process according to claim 1, wherein the mixing unit is a modular, relocatable mixing unit.

6. The process according to claim 1, wherein step [1] comprises an additional homogenization step [1b] to be carried out after the mixing the polyacrylamide powder with the aqueous liquid.

7. The process according to claim 1, wherein the transport unit is an ISO tank container.

8. The process according to claim 1, wherein the transport unit is a tank fixed on a truck which comprises an outlet at the rear end of the truck wherein the removing comprising tilting the tank.

9. The process according to claim 1, wherein the transport unit is a tank fixed on a truck which comprises a conus at the bottom side and an outlet opening at the lower end of the conus.

10. The process according to claim 1, wherein the transport unit is filled by pumping the homogeneous aqueous polyacrylamide concentrate into the transport unit.

11. The process according to claim 1, wherein the transport time is from 1 h to 28 days.

12. The process according to claim 1, wherein the homogeneous aqueous polyacrylamide concentrate is removed from the transport unit by means of a pump.

13. The process according to claim 12, wherein the removal of the homogeneous aqueous polyacrylamide concentrate from the transport unit is supported by gas pressure.

* * * * *